Jan. 16, 1923.
S. JAY.
HOSE SUPPORTER.
FILED JAN. 3, 1921.
1,442,475
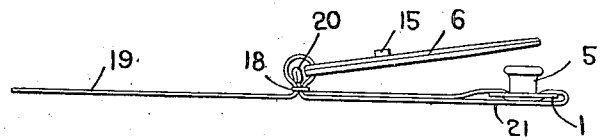
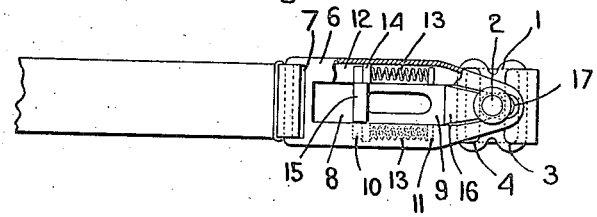
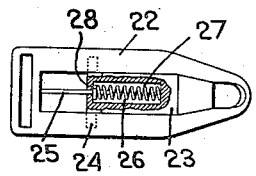
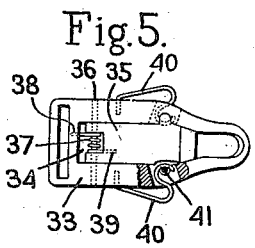
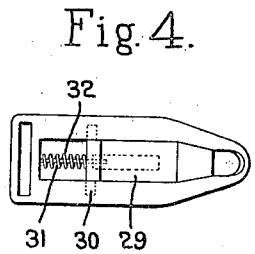
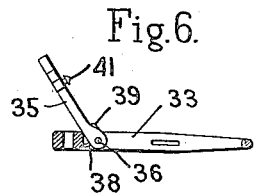
Inventor.
Secil Jay
by Heard Smith & Tennant.
Attys.

Patented Jan. 16, 1923.

1,442,475

UNITED STATES PATENT OFFICE.

SECIL JAY, OF DORCHESTER, MASSACHUSETTS.

HOSE SUPPORTER.

Application filed January 3, 1921. Serial No. 434,723.

*To all whom it may concern:*

Be it known that I, SECIL JAY, a citizen of Russia, and resident of Dorchester, county of Suffolk, State of Massachusetts, have invented an Improvement in Hose Supporters, of which the following description, in connection with the accompanying drawing, is a specification, like characters on the drawing representing like parts.

This invention relates to a hose supporter and is designed to afford a device of this character in which the hose will be firmly locked in place in the supporter so that a firm grip is had upon the hose.

The object of this invention is to provide a hose supporter particularly adapted for the use of women and children where considerable strain is placed upon the hose in supporting it in place and in the movements of the wearer. The object of the invention is firmly to lock the hose in place in the supporter.

The object of the invention is further to provide a supporter of the type having a base provided with a projecting stud and a loop member in which the loop member is provided with a movable locking member which, when in closed position, clamps the hose against the stud.

The object of the invention is further to provide an elastic yielding means for locking the hose against the stud so that there is no danger of injury to the hose.

The object of the invention is further to provide a simple and efficient means for connecting the loop and base members to the hose supporter in hinged relation by means of the webbing.

These and other objects and features of the invention will appear more fully from the accompanied description and drawings and will be particularly pointed out in the claims.

In the drawings:

Fig. 1 is a view in side elevation with the parts in open position of a preferred form of hose supporter embodying the invention.

Fig. 2 is a top plan view partially broken away in the construction shown in Fig. 1 with the parts of the supporter in closed position.

Fig. 3 is a top plan view partially broken away of another form of loop member.

Fig. 4 is a top plan view of a third form of loop member.

Fig. 5 is a top plan view partially broken away of a fourth form of loop member.

Fig. 6 is a view chiefly in vertical section of the loop member shown in Fig. 5.

The hose supporter of this invention comprises a base member and a loop member and the usual piece of webbing. The base and loop members are preferably formed of metal in any suitable manner. The base member is shown as having a flat metal base 1 and a stud 2 projecting therefrom. The base 1 at the front and rear of the stud is slotted at 3 and 4 to receive the webbing. The stud is preferably covered with a facing 5 of elastic material such as rubber.

The loop member 6 which is also formed of metal may take various forms. Referring to the forms shown in Figures 1 and 2, this loop member is of general flat elongated shape and is provided at its rear end with a webbing slot 7. The loop member 6 presents a longitudinal aperture 8. In this aperture is movably mounted the locking member 9. In this form the locking member 9 is a plunger mounted to slide longitudinally in the aperture 8 and yieldingly pressed toward the stud. For this purpose the locking member 9 is conveniently provided with guide pins 10 and 11 sliding in slots or grooves 12 in the side walls of the aperture 8. Helical springs 13 are mounted in these grooves and extend between the forward pin 11 and fixed abutments 14, thus acting yieldingly to press the plunger toward the stud. A projection 15 on the locking member 9 enables it readily to be grasped and retracted manually.

The locking member 9 at its forward end is preferably faced with elastic material such as a block of rubber 16. The end wall of the aperture 8 is also preferably faced with elastic material such as the rubber insert 17.

The loop member is mounted in hinged relation to the base member and preferably by means of the webbing. This is secured by the manner in which the webbing is threaded through the loop and base members together with a flat slotted metal buckle 18.

The webbing 19 at its end is provided with a metal clasp 20. From this clasp the webbing extends through the slot of the buckle 18, thence along in a run 21 beneath the base, thence over the front edge of the base and down through the front slot 3, thence beneath the base and over the run 21 of webbing, thence up through the rear slot 4 of the base, thence above the run 21 of webbing, thence up through the slot of buckle 18, thence up through the slot 7 of the loop member, thence down again through the buckle slot. Hence it will be seen, as clearly shown in Figs. 1 and 2, that the loop member is hinged by means of the webbing to the base member. This provides a simple form of connection of the members of the hose supporter.

When the hose is to be clamped in place the loop member is swung into open position as shown in Fig. 1 and the locking member 9 is retracted against the springs 13 by means of the projection 15. The edge of the hose is then placed over the stud, the loop swung downward and the locking member released. The hose is then automatically and firmly gripped and clasped over the stud and between the stud, the forward end of the locking member 9 and the inner end of the aperture 8, all of which are preferably faced with an elastic material such as rubber and consequently no damage or injury is incurred by the hose even when placed under great strain. The grip is such a firm one that it is impossible to withdraw the hose. When it is desired to release the hose the locking member 9 is again retracted and the loop member swung out of position.

Various means may be employed for yieldingly projecting the locking member 9 in the aperture of the loop member. In Figure 3 the loop member 22 is provided with a locking member 23 generally similar to that described. In this case the locking member is provided with a guide pin 24 sliding in the side walls of the aperture. The locking member is also guided and slides over a longitudinal pin 25 mounted in the loop member. This pin extends in a longitudinal central aperture 26 in the locking member and in this aperture is mounted a helical spring 27. A collar 28 is mounted on the pin 25 and abuts the rear end of the spring 27. This affords a simple means of guiding and yieldingly pressing the locking member forwardly to the aperture of the loop member.

In Figure 4 still another form of loop member is shown. In this case the locking member 29 is guided by a transverse pin 30 and a longitudinal pin 31 but in this case the spring 32 is mounted between the locking member and the rear wall of the aperture in the loop member and surrounds the pin 31.

The locking member may also be moved into and out of closed position to engage the stud by a swinging or pivotal movement, and a form of such construction is shown in Figures 5 and 6. In this form the loop member 33 is provided with a longitudinal aperture 34 and the locking member 35 is pivoted at its rear end upon a pin 36 extending transversely through the loop member. A helical spring 37 is coiled about the pin 36 and engages the loop member at one end 38 and the locking member at the other end 39 and is so arranged as normally to tend to swing the locking member into open position as shown in Figure 6. The locking member is swung backwardly into engaging position to clamp the hose against the stud and is held in closed position by suitable locking means. As an illustrative form of such means there are shown the wire spring hook members 40 adapted to engage at their free hooked ends small studs 41 projecting downwardly from the sides of the locking member 35. The locking member is shown in Figure 5 in closed position with the members 40 in engagement with the studs 41. To release the locking member and allow it to swing to open position the operator presses inwardly upon the spring members 40 thus releasing studs 41 and allowing the locking member 45 to swing upwardly under the action of the spring 37.

Having thus described my invention, what I claim as new and desire to secure by Letters Patent, is

1. A hose supporter comprising a base provided with a projecting stud, a loop member hinged to the base and provided with a longitudinal aperture cooperating at its forward end with and acting to engage the hose against the stud, a plunger mounted to slide in said aperture and means for yieldingly pressing the plunger toward the stud to engage and clamp the hose against the stud.

2. A hose supporter comprising the construction defined in claim 1 in which the forward end of the plunger is provided with an elastic facing.

3. A hose supporter comprising a strip of webbing, a slotted buckle, a base having a projecting stud and slotted in front and rear of the stud, a loop member slotted at its rear end and provided with an aperture to cooperate with and engage and clamp the hose against the stud, a locking member movably mounted on the loop member in said aperture and acting when moved into closed position to engage and clamp the hose against the stud, the webbing extending through the buckle slot, thence beneath the base, thence over the front edge of the base and down through the front slot, thence beneath the base and over the run of webbing therebeneath, thence up through the rear slot of the base, thence above the first run of webbing, thence up through the buckle slot, thence up through the loop slot and thence down through the buckle slot.

In testimony whereof, I have signed my name to this specification.

SECIL JAY.